US009625685B2

(12) United States Patent
Ogawa et al.

(10) Patent No.: US 9,625,685 B2
(45) Date of Patent: Apr. 18, 2017

(54) AUTOMOBILE WINDOW GLASS

(71) Applicant: Asahi Glass Company, Limited, Chiyoda-ku, Tokyo (JP)

(72) Inventors: Masanobu Ogawa, Tokyo (JP); Junzo Ooe, Aichi (JP); Takuma Sawaya, Aichi (JP); Takashi Kitagawa, Aichi (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 950 days.

(21) Appl. No.: 13/941,339

(22) Filed: Jul. 12, 2013

(65) Prior Publication Data
US 2013/0301118 A1 Nov. 14, 2013

Related U.S. Application Data

(63) Continuation of application No. PCT/JP2012/050375, filed on Jan. 11, 2012.

(30) Foreign Application Priority Data

Jan. 14, 2011 (JP) ................................ 2011-006019

(51) Int. Cl.
*G02B 13/14* (2006.01)
*B60J 1/02* (2006.01)
(Continued)

(52) U.S. Cl.
CPC ........ *G02B 13/14* (2013.01); *B32B 17/10036* (2013.01); *B32B 17/10174* (2013.01);
(Continued)

(58) Field of Classification Search
CPC .............. G02B 13/14; B32B 17/10761; B32B 17/10036; B32B 17/10174;
(Continued)

(56) References Cited

U.S. PATENT DOCUMENTS 5,418,025 A * 5/1995 Harmand .......... B32B 17/10036
219/203
5,620,799 A 4/1997 Sauer
(Continued)

FOREIGN PATENT DOCUMENTS

JP 08-210042 8/1996
JP 2003-170739 6/2003
(Continued)

OTHER PUBLICATIONS

International Search Report PCT/JP2012/050375 dated Apr. 24, 2012.
(Continued)

*Primary Examiner* — Pinel Romain
(74) *Attorney, Agent, or Firm* — Foley & Lardner LLP

(57) ABSTRACT

The present invention relates to a window glass for a vehicle, attached to a body flange of the vehicle at a circumferential edge portion thereof, including: an infrared ray shielding portion which reflects or absorbs infrared rays on a large part of the window; and electromagnetic wave transmitting portions having a substantially rectangular shape, which transmit at least a predetermined electromagnetic wave, at each of lower end portions on both sides in a width direction of the vehicle.

13 Claims, 4 Drawing Sheets

(51) Int. Cl.
 B32B 17/10 (2006.01)
 G02B 5/20 (2006.01)
 G02B 5/28 (2006.01)
 C03C 17/34 (2006.01)
 H01Q 1/12 (2006.01)
 H01Q 1/52 (2006.01)

(52) U.S. Cl.
 CPC .. *B32B 17/10183* (2013.01); *B32B 17/10761* (2013.01); *B60J 1/02* (2013.01); *C03C 17/34* (2013.01); *G02B 5/208* (2013.01); *G02B 5/282* (2013.01); *H01Q 1/1271* (2013.01); *H01Q 1/526* (2013.01); *C03C 2218/365* (2013.01)

(58) Field of Classification Search
 CPC ................. B32B 17/10183; B60J 1/02; C03C 2218/365; H01Q 1/1271; H01Q 1/526
 USPC .............................................. 296/84.1, 96.19
 See application file for complete search history.

(56) References Cited

U.S. PATENT DOCUMENTS

| | | |
|---|---|---|
| 6,356,236 B1 | 3/2002 | Maeuser et al. |
| 6,492,619 B1 * | 12/2002 | Sol .................... B32B 17/10192 219/203 |
| 6,559,419 B1 * | 5/2003 | Sol .................... B32B 17/10192 219/203 |
| 6,860,081 B2 | 3/2005 | Walton et al. |
| 7,019,260 B1 | 3/2006 | Degand et al. |
| 8,022,333 B2 * | 9/2011 | Maeuser ........... B32B 17/10036 219/203 |
| 8,809,742 B2 * | 8/2014 | Reul ....................... H05B 3/84 219/203 |
| 2003/0232197 A1 | 12/2003 | Disteldorf |
| 2005/0089691 A1 | 4/2005 | Noguchi et al. |
| 2005/0164014 A1 * | 7/2005 | Tomonaga ............ C03C 17/008 428/432 |
| 2006/0010794 A1 | 1/2006 | Walton et al. |
| 2007/0176402 A1 * | 8/2007 | Irie .................... G06K 9/00362 280/735 |
| 2007/0187382 A1 | 8/2007 | Mauser |

FOREIGN PATENT DOCUMENTS

| | | |
|---|---|---|
| JP | 2004-040571 | 2/2004 |
| JP | 2010-068154 | 3/2010 |
| WO | WO 03/055821 A1 | 7/2003 |

OTHER PUBLICATIONS

Charles S. Voeltzel, "Electromagnetic Compatibility of Conductive Heat Reflecting Automotive Windows", Copyright 2009 SAE International, SAE Paper No. 2009-01-1143, 8 pgs.

* cited by examiner

AUTOMOBILE WINDOW GLASS

TECHNICAL FIELD

The present invention relates to a window glass for a vehicle and more particularly to a window glass for a vehicle having an infrared ray shielding performance.

BACKGROUND OF THE INVENTION

In recent years, there is an increasing tendency to use a glass having an infrared ray shielding performance (hereinafter, referred to as an infrared ray shielding glass) for a window glass for a vehicle for the purpose of suppressing the increase in temperature inside a vehicle and reducing the cooling load. Conventionally, as an infrared ray shielding glass, a film-laminated glass sheet is used on the surface of which a conductive thin film of various types of metal or metal oxides is laminated, and solar radiation energy entering the inside a vehicle is largely cut off by the function of these films.

However, it is known that the infrared ray shielding glass not only cuts off infrared rays but also interrupts electromagnetic waves of a mobile phone. In addition, in the United States, it is mandatory to equip a vehicle with a TPMS (Tire Pressure Monitoring System) which detects air pressure of tires to warn deficiency air pressure of the tires. In this TPMS, for example, infrared signals are sent from transmitters integrated with tire valves to a receiver on a vehicle body.

Further, in recent years, as systems employing infrared rays, keyless entry system and garage door openers are also prevailing. The keyless entry system and the garage door openers are a system in which an infrared signal is sent from a transmitter inside a vehicle to a receiver on a garage, thereby opening and closing the door or the garage.

Thus, in order to cause these systems to operate properly, the glass needs to have an electromagnetic wave transmitting performance.

In a window glass for a vehicle described in Patent Document 1, a transmitter/receiver is attached directly to part of a window glass on an inner side of a vehicle, and an infrared ray shielding layer is not provided only in the position where the transmitter/receiver is attached, whereby an electromagnetic wave communication is permitted between an exterior of the vehicle and the transmitter/receiver while cutting off solar radiation energy.

BACKGROUND ART

Patent Document

[Patent Document 1] JP-A-8-210042

SUMMARY OF THE INVENTION

Problems that the Invention is to Solve

However, although it is effective to the transmitter/receiver which is attached directly to the window glass, the window glass for a vehicle described in Patent Document 1 cannot deal properly with a transmitter/receiver which is disposed away from the window glass, and therefore, there are concerns that a problem is caused in an electromagnetic wave communication and, in particular, in a normal use of a mobile phone.

Then, an object of the invention is to provide a window glass for a vehicle that enables an electromagnetic wave communication and in particular the use of a mobile phone and which has an infrared ray shielding performance.

Means for Solving the Problems

According to the invention, the following embodiment will be provided.

(1) A window glass for a vehicle attached to a body flange of the vehicle at a circumferential edge portion thereof, comprising; an infrared ray shielding portion which reflects or absorbs infrared rays on a large part of the window; and electromagnetic wave transmitting portions having a substantially rectangular shape, which transmit at least a predetermined electromagnetic wave, at each of lower end portions on both sides in a width direction of the vehicle.

(2) The window glass for a vehicle according to (1), wherein when a wavelength in the air at a central frequency of a frequency band of the predetermined electromagnetic wave to be transmitted is $\lambda 0$, a shortening coefficient of wavelength in a glass is k (provided that, k=0.64), and a wavelength on a glass is $\lambda g = \lambda 0 \cdot k$, an upper edge of the electromagnetic wave transmitting portion is spaced $2\lambda g$ or more away from the body flange which is positioned at lower side thereof, and an inner lateral edge of the electromagnetic wave transmitting portion is spaced $3.6\lambda g$ or more away from the body flange which is positioned sideways thereof.

(3) The window glass for a vehicle according to (1), wherein an upper edge of the electromagnetic transmitting portion is spaced 170 mm or more away from the body flange which is positioned at lower side thereof, and an inner lateral edge of the electromagnetic wave transmitting portion is spaced 300 mm or more away from the body flange which is positioned sideways thereof.

(4) The window glass for a vehicle according to any one of (1) to (3), comprising: an electromagnetic wave transmitting connecting portion that connects the electromagnetic wave transmitting portions on both sides in a width direction of the vehicle at a lower end portion of the window glass for a vehicle, and where the infrared ray shielding portion is not formed, wherein a distance between an upper edge of the electromagnetic wave transmitting connecting portion and the body flange which is positioned at lower side thereof is smaller than a distance between the upper edge of the electromagnetic wave transmitting portion and the body flange which is positioned at lower side thereof.

(5) The window glass for a vehicle according to (4), wherein the upper edge of the electromagnetic wave transmitting connecting portion is spaced 95 mm or more away from the body flange which is positioned at lower side thereof.

(6) The window glass for a vehicle according to any one of (1) to (5), wherein the infrared ray shielding portion is positioned inwards from a tip portion of the body flange.

(7) The window glass for a vehicle according to any one of (1) to (6), wherein the electromagnetic wave transmitting portion is a frequency selective surface in which a thermal wave reflective film is formed in a mesh-shape.

(8) The window glass for a vehicle according to any one of (1) to (7), wherein the window glass for a vehicle is a windshield which is placed at the front side of a vehicle.

Advantage Of The Invention

According to the invention, the increase in temperature inside the vehicle can be suppressed and the cooling load can be reduced as a result of the transmission of infrared rays being interrupted by the infrared ray shielding portion provided on substantially the whole surface of the window glass for a vehicle. In addition, the substantially rectangular electromagnetic wave transmitting portions are formed individually at lower end portions on both sides in a width direction of the vehicle, and therefore, for example, even though an on-board device or a mobile phone is disposed away from the window glass, the onboard device or the mobile phone can be used well by avoiding an electromagnetic wave problem.

MODE FOR CARRYING OUT THE INVENTION

Figure 1:
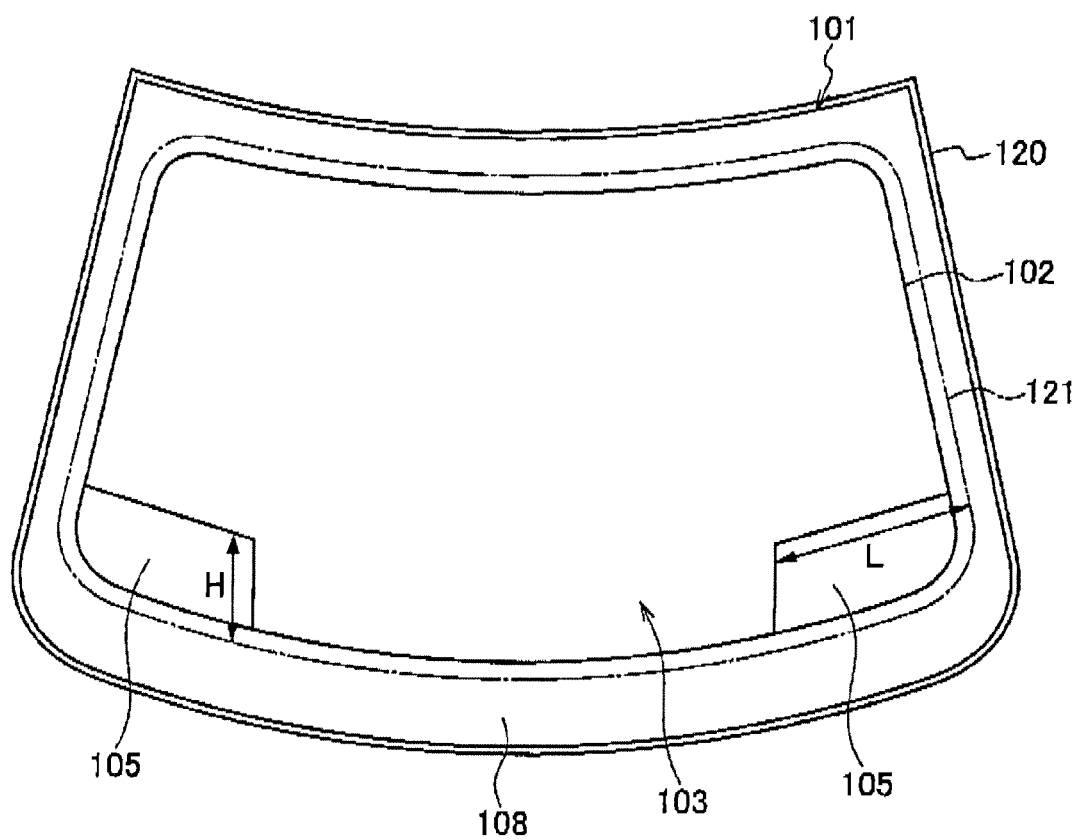
FIG. 1 is a front view of a window glass for a vehicle according to one embodiment of the invention.

Next, an embodiment of the invention will be described.
FIG. 1 is a front view of a window glass for a vehicle according to one embodiment of the invention. A window glass for a vehicle 101 of this embodiment is a so-called laminated glass and is used as a windshield which is fitted in a substantially rectangular opening portion 120 of a body of a vehicle. The window glass for a vehicle 101 is bonded and fixed to a body flange 121 which projects inwards from the opening portion 120 for the windshield via an adhesive 107 (refer to FIG. 2).

Figure 2:
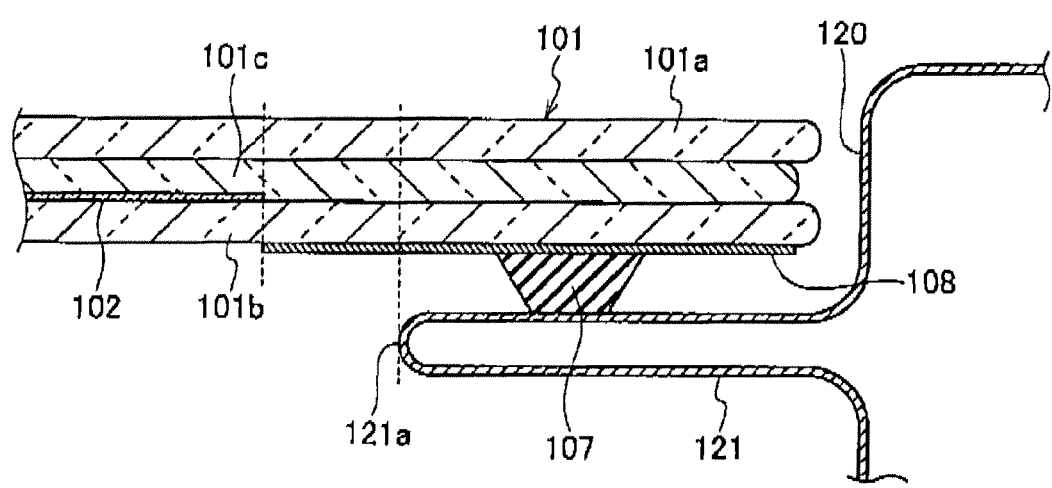
FIG. 2 is a partial sectional view of the window glass for a vehicle shown in FIG. 1.

As shown in FIG. 2, the window glass for a vehicle 101 is a laminated glass in which an intermediate film 101c of transparent resin such as PVB (Polyvinyl Butyral) or the like is sandwiched by a glass sheet which is positioned on an outer side of the vehicle (an outer sheet 101a) and a glass sheet which is positioned on an inner side of the vehicle (an inner sheet 101b) therebetween. A black ceramic layer 108, which is formed by being screen printed and then fired, is provided on an inner side surface of a circumferential edge of the inner sheet 101b so as to extend along the full circumference of the window glass for a vehicle 101 in a substantially frame-shape. The black ceramic layer 108 is a black or dark-colored ceramic film and can prevents the transmission of not only visible light but also ultraviolet rays, thereby making it possible to prevent the deterioration of the adhesive 107 by ultraviolet rays. In addition, the adhesive 107 becomes invisible from the outside of the window glass for a vehicle 101, thereby increasing the aesthetic properties of an external appearance thereof. It should be noted that the black ceramic layer 108 may be provided either on an inner side surface of the outer sheet 101a or an outer surface of the inner sheet 101b.

A conductive film 102 is provided on an outer surface of the inner sheet 101b in the form of a film or a coating. This conductive film 102 is cut back inwards on the order of several centimeters from an outer circumferential edge portion of the inner sheet 101b along a full circumference thereof, and the area where the conductive film 102 is formed constitutes an infrared ray shielding portion 103 having an infrared ray shielding performance. In this embodiment, this cut-back amount is set so that the conductive film 102 lies inwards of the opening portion 120 along a full circumference thereof in such a way that the conductive film 102 does not overlap the body flange 121 which forms the opening portion 120, that is, the conductive film 102 is offset from the body flange 121 with the window glass for a vehicle 101 fitted in the opening portion 120. In addition, in this embodiment, although not particularly limited thereto, an edge portion of the conductive film 102 is set so as to substantially coincide with a tip portion 121a of the body flange 121, By setting so, the infrared shielding area 103 can be made as small as possible while maintaining the infrared ray shielding effect as it is. Additionally, the conductive film 102 may be provided on the inner side surface of the outer sheet 101a or the intermediate film 101c in the form of a film or a coating or may be provided by sandwiching a conductive film between two intermediate films.

In addition, electromagnetic wave transmitting portions 105 are provided in the window glass for a vehicle 101 of this embodiment so as to enable an electromagnetic wave communication of an on-board device and a call by a mobile phone. Incidentally, the electromagnetic wave transmitting portions 105 are formed by not providing the conductive film 102 at target areas. Alternatively, a frequency selective surface (FSS) where a mesh-shape or slit-shape pattern adapted to transmit a predetermined electromagnetic wave is formed may be provided at the target areas in the conductive film 102. By not providing the conductive film 102 or by forming the frequency selective surface, predetermined electromagnetic waves including infrared rays can be transmitted.

As shown in FIG. 1, the electromagnetic wave transmitting portions 105 are provided individually into a substantially rectangular shape on both sides in a width direction of the vehicle at the lower end portion of the window glass for a vehicle 101. Namely, when looking at the window glass for a vehicle 101 from the front side of the vehicle, two electromagnetic wave transmitting portions 105 having a substantially rectangular shape are formed individually in a transversely symmetrical fashion in a left lower corner portion and a right lower corner portion. By providing the electromagnetic wave transmitting portions individually in the left lower corner portion and the right lower corner portion in the way described above, even in the event that no electromagnetic transmitting portion is provided at the center of the lower end portion of the window glass for a vehicle 101, the sending and reception environments of a mobile phone disposed on a center console can be improved.

Additionally, when a wavelength in the air at a central frequency of a frequency band of the predetermined electromagnetic wave to be transmitted is λ0, a shortening coefficient of wavelength in a glass is k (provided that, k=0.64), and a wavelength on a glass is λg=λ0·k, by providing an electromagnetic wave transmitting portion in such a way that an upper edge of the electromagnetic wave transmitting portion 105 is spaced 2λg or more away from the body flange 121 which is positioned at lower side thereof and an inner lateral edge of the electromagnetic wave transmitting portion 105 is spaced 3.6λg or more away from the body flange 121 which is positioned sideways thereof, it is possible to set an optimum electromagnetic wave transmitting portion 105. Although depending upon the design of a window glass, taking it into consideration that the infrared ray shielding portion 103 should be ensured over a wide area, the electromagnetic wave transmitting portion 105 is preferably formed smaller. "The distance defined from the body flange 121" means a distance that is defined from the tip portion 121*a* of the body flange 121.

For example, in the case of magnetic waves for PCS mobile phones (frequency band: 1850 MHz to 1990 MHz) which are available from the digital mobile phone service provided in the United States and Canada, it is preferable that the electromagnetic wave transmitting portion 105 is provided in such a way that the upper edge of the electromagnetic wave transmitting portion 105 is spaced 170 mm or more away from the body flange 121 which is positioned at lower side thereof and the inner lateral edge of the electromagnetic wave transmitting portion 105 is spaced 300 mm or more away from the body flange 121 which is positioned sideways thereof.

Figure 4:
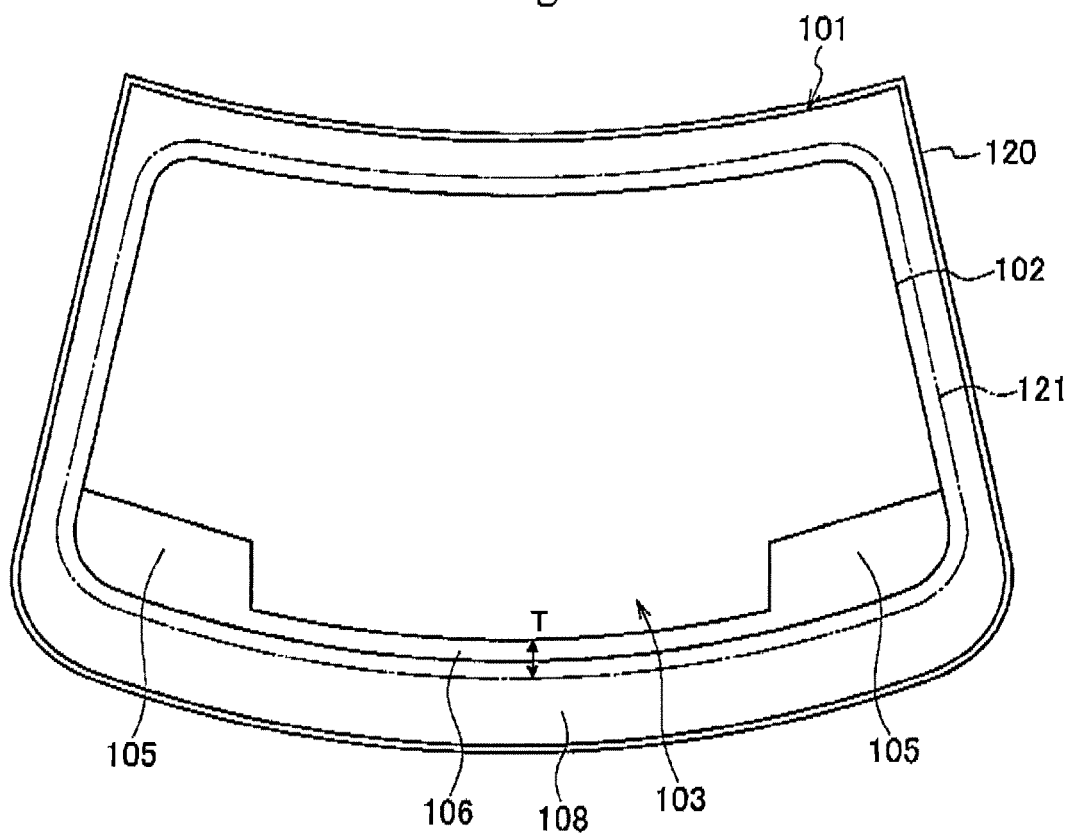
FIG. 4 is a front view of a window glass for a vehicle according to a modified example to the window glass for a vehicle shown in FIG. 1.

FIG. 4 is a front view of a window glass for a vehicle of another embodiment in the invention. The embodiment shown in FIG. 4 is such that an electromagnetic wave transmitting connecting portion 106 which connects the electromagnetic wave transmitting portions 105 on both sides in a width direction of the vehicle and without forming the infrared ray shielding portion at the lower end portion of the window glass for a vehicle 101 of the embodiment shown in FIG. 1, is provided. The electromagnetic wave transmitting connecting portion 106 is formed so that a distance between an upper edge of the electromagnetic wave transmitting connecting portion 106 and the body flange 121 which is positioned at lower side thereof is shorter than the distance between the upper edge of the electromagnetic wave transmitting portion 105 and the body flange 121 which is positioned at lower side thereof. The signal reception environment of an on-board device which is incorporated in a rear pillar of the vehicle is largely improved by this electromagnetic wave transmitting connecting portion 106. For example, an example of such a device is a receiver which receives signals from tire air pressure sensors of a TPMS which are integrated with tire valves.

In addition, the electromagnetic wave transmitting connecting portion 106 is formed preferably so that the upper edge of the electromagnetic wave transmitting connecting portion 106 is positioned 95 mm or more away from the body flange 121 which is positioned at lower side thereof. By positioning 95 mm or more away, for example, the signal reception environments from the tire air pressure sensors which are integrated with the tire valves are received can be improved largely.

EXAMPLES

Example 1

Figure 3:
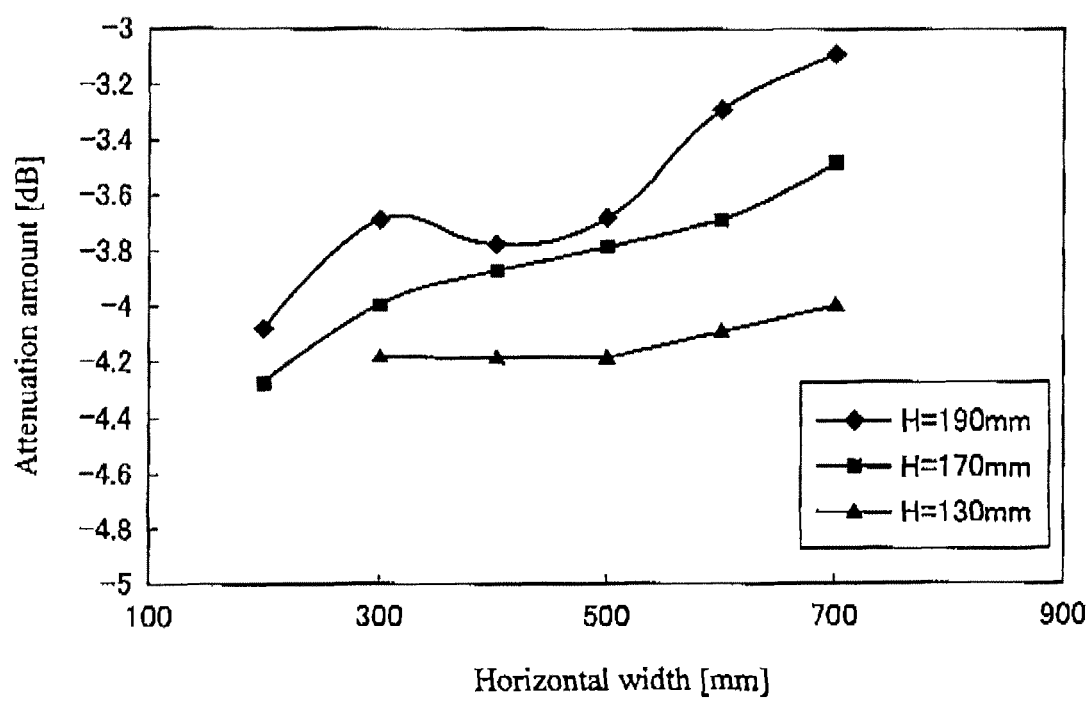
FIG. 3 is a graph showing the results of measurements of electromagnetic wave attenuation amounts by disposing a PCS mobile phone (frequency band: 1850 MHz to 1990 MHz) in a center console and changing a height of an electromagnetic wave transmitting portion and a horizontal width of the electromagnetic wave transmitting portion.

FIG. 3 shows the results of measurements of electromagnetic wave attenuation amounts which were carried out by changing the height of the electromagnetic wave transmitting portion and the horizontal width of the electromagnetic wave transmitting portion of the window glasses for a vehicle with a PCS mobile phone placed on a center console. The measurements were made on three types of the window glasses prepared of which heights of electromagnetic wave transmitting portions were 190 mm, 170 mm, and 130 mm while changing horizontal widths thereof. "The horizontal width of the electromagnetic wave transmitting portion" means a distance L along the surface of the window glass between a vertical inner lateral edge of the electromagnetic wave transmitting portion 105 which lies inwards of the window glass 101 and the tip portion 121*a* of the body flange 121 which is positioned sideways thereof (refer to FIG. 1). "The height of the electromagnetic wave transmitting portion" means a height along the surface of the window glass between the upper edge of the electromagnetic wave transmitting portion 105 and the tip portion 121*a* of the body flange 121 which is positioned at lower side thereof (refer to FIG. 1).

In a graph shown in FIG. 3, an axis of abscissas denotes the horizontal width (mm) of the electromagnetic wave transmitting portion, and an axis of ordinates denotes the attenuation amount (dB) compared with a window glass for a vehicle having no infrared ray shielding portion. Namely, in the case where attenuation amounts of one prepared window glass for a vehicle are equal to that of the window glass for a vehicle having no infrared ray shielding portion, the attenuation values of the prepared window glass for a vehicle are 0 dB. The measuring method of attenuation amounts was such that a vehicle having the target window glass as a windshield fitted in a frame at the front side of the vehicle was disposed in an electromagnetic wave dark room and an attenuation amount of an electromagnetic wave in a mean band of the PCS frequency from an electromagnetic wave transmitting position to an electromagnetic wave reception position on the center console was measured. The elevation angle between the electromagnetic wave transmitting position and an antenna conductor was substantially horizontal (a direction in which the elevation angle=0° when the elevation angle=0° on a surface parallel to the ground and the elevation angle=90° in the direction of the zenith).

According to FIG. 3, with the height of the electromagnetic wave transmitting portion 105 being 130 mm, even though the horizontal width of the electromagnetic wave transmitting portion 105 is increased, the attenuation amount is not much improved. On the other hand, it is seen that with the height of the electromagnetic wave transmitting portion 105 being 170 mm, even though the horizontal width of the electromagnetic wave transmitting portion 105 is 300 mm, the attenuation amount is improved much.

Example 2

As shown in FIG. 4, a window glass for a vehicle with an infrared ray shielding portion comprising an electromagnetic wave transmitting connecting portion 106 which connects electromagnetic wave transmitting portions 105 on both sides in a width direction of the vehicle and not formed the infrared ray shielding portion at a lower end portion of the window glass for a vehicle 101, was prepared and an experiment was carried out on the reception performance of a receiver for tire air pressure sensors of a TPMS which was incorporated in a rear pillar of the vehicle.

Measurements were carried out on a plurality of window glasses for a vehicle having electromagnetic wave transmitting portions which differ in height by calculating their reception rates when the tire was rotated a full rotation. The height of the electromagnetic wave transmitting connecting portion 106 means a distance T along the surface of the window glass between the upper edge of the electromagnetic wave transmitting connecting portion 106 and the body flange 121 which is positioned at lower side thereof (refer to FIG. 4).

It has been found from the results of the measurements that by setting the height of the electromagnetic wave transmitting connecting portion 106 to 95 mm or higher, the reception rate when the tire is rotated a full rotation becomes 60% or more. Thus, it has been found from this that the reception rate is improved largely.

INDUSTRIAL APPLICABILITY

In a window glass for a vehicle 101 of the invention, by reflecting or absorbing infrared rays by the infrared ray shielding portion 103, the increase in temperature inside the vehicle can be suppressed, so as to reduce the cooling load. On the other hand, the electromagnetic wave transmitting portions 105 are provided individually into the substantially rectangular shape on both sides in a width direction of the vehicle at the lower end portion of the window glass for a vehicle 101, and therefore, the electromagnetic waves of the on-board device such as the mobile phone are allowed to be transmitted through the window glass for a vehicle 101, whereby the mobile phone and other on-board devices can be used well.

In addition, the electromagnetic wave transmitting portions 105 are provided individually on both sides in a width direction of the vehicle at the lower end portion of the window glass for a vehicle 101, and therefore, the boundaries with the infrared ray shielding portion 103 interrupts in no way the visibility of occupants of the vehicle.

Incidentally, it should be noted that the invention is not limited by the embodiments described heretofore and hence can be modified or improved as required. In addition, although the mobile phone and the receiver for the tire air pressure sensors are described as being the examples of the on-board devices, the invention is not limited thereto, and hence, the invention is also effective, for example, to a remote keyless entry.

While the invention has been described in detail with reference to specific embodiments thereof, it will be apparent to one skilled in the art that various changes and modifications can be made therein without departing from the spirit and scope thereof.

Incidentally, the present application is based on Japanese Patent Application No. 2011-006019 filed on Jan. 14, 2011, and the contents are incorporated herein by reference.

DESCRIPTION OF REFERENCE NUMERALS AND SIGNS

101 Window glass for a vehicle;
101a Outer sheet;
101b Inner sheet;
101c Intermediate film;
102 Conductive film;
103 Infrared ray shielding portion;
105 Electromagnetic wave transmitting portion;
106 Electromagnetic wave transmitting connecting portion;
107 Adhesive;
108 Black ceramic layer,
120 Opening portion;
121 Body Flange;
121a Tip portion.

The invention claimed is:

1. A window glass for a vehicle, attached to a body flange of the vehicle at a circumferential edge portion thereof, comprising:
    an infrared ray shielding portion which reflects or absorbs infrared rays on a large part of the window; and
    electromagnetic wave transmitting portions having a substantially rectangular shape, which transmit at least a predetermined electromagnetic wave, at each of lower end portions on both sides in a width direction of the vehicle, wherein the electromagnetic wave transmitting portions are frequency selective surfaces in which a thermal wave reflective film is formed in a mesh-shape.

2. The window glass for a vehicle according to claim 1, wherein when a wavelength in the air at a central frequency of a frequency band of the predetermined electromagnetic wave to be transmitted is $\lambda 0$, a shortening coefficient of wavelength in a glass is k (provided that, k=0.64), and a wavelength on a glass is $\lambda g = \lambda 0 \cdot k$,
    an upper edge of the electromagnetic wave transmitting portion is spaced $2\lambda g$
    or more away from the body flange which is positioned at lower side thereof, and
    an inner lateral edge of the electromagnetic wave transmitting portion is spaced $3.6\lambda g$ or more away from the body flange which is positioned sideways thereof.

3. The window glass for a vehicle according to claim 1, wherein an upper edge of the electromagnetic transmitting portion is spaced 170 mm or more away from the body flange which is positioned at lower side thereof, and
    an inner lateral edge of the electromagnetic wave transmitting portion is spaced 300 mm or more away from the body flange which is positioned sideways thereof.

4. A window glass for a vehicle, attached to a body flange of the vehicle at a circumferential edge portion thereof, comprising:
    an infrared ray shielding portion which reflects or absorbs infrared rays on a large part of the window; and
    electromagnetic wave transmitting portions having a substantially rectangular shape, which transmit at least a predetermined electromagnetic wave, at each of lower end portions on both sides in a width direction of the vehicle, wherein
    an electromagnetic wave transmitting connecting portion connects the electromagnetic wave transmitting portions on both sides in a width direction of the vehicle at a lower end portion of the window glass for a vehicle, and where the infrared ray shielding portion is not formed, and
    wherein a distance between an upper edge of the electromagnetic wave transmitting connecting portion and the body flange which is positioned at lower side thereof is smaller than a distance between the upper edge of the electromagnetic wave transmitting portion and the body flange which is positioned at lower side thereof.

5. The window glass for a vehicle according to claim 4, wherein the upper edge of the electromagnetic wave transmitting connecting portion is spaced 95 mm or more away from the body flange which is positioned at lower side thereof.

6. The window glass for a vehicle according to claim 1, wherein the infrared ray shielding portion is positioned inwards from a tip portion of the body flange.

7. The window glass for a vehicle according to claim 4, wherein the electromagnetic wave transmitting portion is a frequency selective surface in which a thermal wave reflective film is formed in a mesh-shape.

8. The window glass for a vehicle according to claim 1, wherein the window glass for the vehicle is a windshield which is placed at the front side of a vehicle.

9. The window glass for a vehicle according to claim 4, wherein when a wavelength in the air at a central frequency of a frequency band of the predetermined electromagnetic wave to be transmitted is $\lambda 0$, a shortening coefficient of wavelength in a glass is k (provided that, k=0.64), and a wavelength on a glass is $\lambda g = \lambda 0 \cdot k$, an upper edge of the electromagnetic wave transmitting portion is spaced $2\lambda g$ or more away from the body flange which is positioned at lower side thereof, and an inner lateral edge of the electromagnetic wave transmitting portion is spaced $3.6\lambda g$ or more away from the body flange which is positioned sideways thereof.

10. The window glass for a vehicle according to claim 4, wherein an upper edge of the electromagnetic transmitting portion is spaced 170 mm or more away from the body flange which is positioned at lower side thereof, and an inner lateral edge of the electromagnetic wave transmitting portion is spaced 300 mm or more away from the body flange which is positioned sideways thereof.

11. The window glass for a vehicle according to claim 4, wherein the infrared ray shielding portion is positioned inwards from a tip portion of the body flange.

12. The window glass for a vehicle according to claim 4, wherein the electromagnetic wave transmitting portion is a frequency selective surface in which a thermal wave reflective film is formed in a mesh-shape.

13. The window glass for a vehicle according to claim 4, wherein the window glass for the vehicle is a windshield which is placed at the front side of a vehicle.

* * * * *